United States Patent [19]

Hartwig et al.

[11] 4,442,287

[45] Apr. 10, 1984

[54] ANTHRAQUINONE DYES

[75] Inventors: Ernst Hartwig, Heidelberg; Reinhold Krallmann, Weisenheim, both of Fed. Rep. of Germany

[73] Assignee: BASF Aktiengesellschaft, Ludwigshafen, Fed. Rep. of Germany

[21] Appl. No.: 393,609

[22] Filed: Jun. 30, 1982

[30] Foreign Application Priority Data

Jul. 10, 1981 [DE] Fed. Rep. of Germany ....... 3127240

[51] Int. Cl.³ ........................................... C07D 251/70
[52] U.S. Cl. .................................................... 544/187
[58] Field of Search ......................................... 544/187

[56] References Cited

U.S. PATENT DOCUMENTS

| 3,163,551 | 12/1964 | Staeuble et al. | 544/187 |
| 3,214,445 | 10/1965 | Hindermann et al. | 544/187 |
| 3,775,048 | 11/1973 | Neeff | 8/39 |
| 4,290,768 | 9/1981 | Neeff et al. | 8/532 |
| 4,292,232 | 9/1981 | Dazzi et al. | 8/532 |

FOREIGN PATENT DOCUMENTS

| EP82105856 | 11/1982 | European Pat. Off. |
| 1794188 | 11/1971 | Fed. Rep. of Germany |
| 1591744 | 6/1981 | United Kingdom |

*Primary Examiner*—John M. Ford
*Attorney, Agent, or Firm*—Oblon, Fisher, Spivak, McClelland & Maier

[57] ABSTRACT

Dyes of the formula

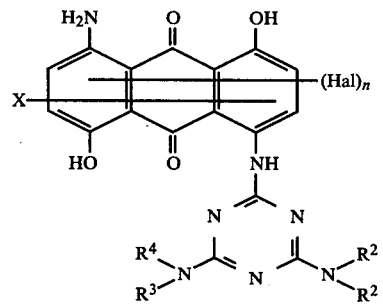

where Hal is chlorine or bromine, X is hydrogen, hydroxyphenyl or alkoxyphenyl, n is 1 or 2, or, when X is hydroxyphenyl or alkoxyphenyl, may furthermore be O, $R^1$, $R^2$, $R^3$ and $R^4$ independently of one another are each unsubstituted or alkoxy-substituted alkyl, and $R^1$ and $R^3$ may furthermore be hydrogen, are of high color strength, and very useful for dyeing and printing cellulose-containing fiber material or cellulose swollen by means of water-miscible swelling agents.

2 Claims, No Drawings

ANTHRAQUINONE DYES

The present invention relates to dyes of the general formula I

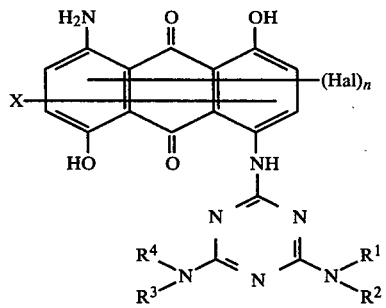

where Hal is chlorine or bromine, X is hydrogen and n is 1 or 2, or X is hydroxyphenyl or $C_1$-$C_3$-alkoxyphenyl and n is 0, 1 or 2, and $R^2$ and $R^4$ independently of one another are each unsubstituted or $C_1$-$C_8$-alkoxy-substituted $C_1$-$C_{18}$-alkyl, and $R^1$ and $R^3$ independently of one another are each hydrogen or unsubstituted or $C_1$-$C_8$-alkoxy-substituted $C_1$-$C_{18}$-alkyl.

$R^1$, $R^2$, $R^3$ and $R^4$ are, for example, $C_1$-$C_{18}$-alkyl, $C_1$-$C_8$-alkoxy-$C_2$-alkyl or $C_1$-$C_8$-alkoxy-$C_3$-alkyl.

Specific examples of radicals $R^1$, $R^2$, $R^3$ and $R^4$ are $CH_3$, $C_2H_5$, $C_3H_7$, $C_4H_9$, $C_6H_{12}$, $C_8H_{17}$, $C_{10}H_{21}$, $C_{12}H_{25}$, $C_{18}H_{37}$, $C_2H_4OCH_3$, $C_2H_4OC_2H_5$, $C_2H_4OC_4H_9$, $C_3H_6OC_4H_9$ and $C_3H_6$-$O$-$C_8H_{17}$.

$R^2$ and $R^4$ are each preferably $C_1$-$C_{10}$-alkyl, $C_1$-$C_4$-alkoxy-$C_2$-alkyl or $C_1$-$C_4$-alkoxy-$C_3$-alkyl, in particular $C_1$-$C_8$-alkyl, methoxyethyl or methoxypropyl. $R^1$ and $R^3$ are each preferably hydrogen or $C_1$-$C_{10}$-alkyl, in particular hydrogen, methyl or ethyl.

Very particularly preferred dyes of the formula I are those where

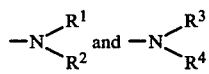

are each $-N(CH_3)_2$ or $-NHCH_3$, Hal is bromine, and n is 1. Among these dyes, those described in Examples 1 and 2 may be particularly singled out.

The compounds of the formula I can be prepared by reacting, for example, a halogenated diaminoanthrarufin of the formula

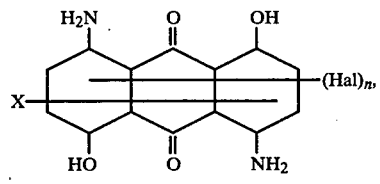

where Hal, X and n have the above meanings, with a compound of the formula

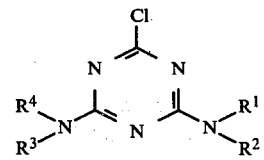

in a conventional manner.

The compounds I may also be prepared by first reacting (II) with an equimolar amount of cyanuric chloride, and then reacting the dichlorotriazinylaminoanthraquinone compound, in a conventional manner, with the appropriate amine or amine mixture

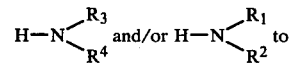

give (I).

The reaction with the amines may be carried out either using a molar ratio of 1:2 or in two stages using equimolar amounts in each stage.

The dyes I can be obtained in the pure form corresponding to formula I, or as mixtures.

The Examples which follow illustrate the reaction; parts and percentages are by weight, unless stated otherwise.

The novel dyes are of high color strength, and are preferably used for dyeing and printing, by the process described in German Patent No. 1,811,796, cellulose-containing fiber material, in particular a cellulose polyester, or cellulose which has been swollen by means of a water-miscible swelling agent.

Fast dyeings are obtained, the lightfastness and wetfastness of which may be singled out.

EXAMPLE 1

52.5 parts of 1,5-dihydroxy-4,8-diamino-x-bromoanthraquinone and 33.5 parts of 2-chloro-4,6-bis-dimethylamino-s-triazine are stirred with 234 parts of o-dichlorobenzene. A gentle stream of nitrogen is passed over the mixture, which is refluxed, while stirring, until all the starting material has been consumed; this takes about 2–3 hours. Thereafter, the mixture is cooled to room temperature, while stirring slowly, and the resulting well-crystallized dye is filtered off rapidly, using a suction filter. The o-dichlorobenzene-moist filter cake is freed of solvent by steam distillation, a small amount of ammonia water being added until a clearly alkaline reaction is obtained. The product is filtered off under suction while still warm, washed neutral with warm water and dried, and 64.6 parts of a dark blue crystalline powder having a melting point of about 250° C. are obtained; analysis of this product gives the following formula:

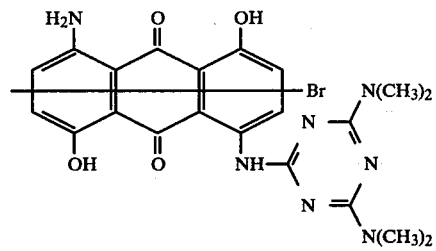

On polyester/cotton, the dye gives very fast clear blue hues in very closely matching shades.

Instead of o-dichlorobenzene, other inert hydrocarbons, eg. toluene, xylene, chlorobenzene, trichlorobenzene, nitrobenzene, p-cymene, or alkylbenzene mixtures, may also be used successfully. Xylene, and alkylbenzene mixtures which are obtainable commercially under the name SOLVESSO, are particularly suitable.

EXAMPLE 2

78 parts of o-dichlorobenzene are taken, and a mixture of 7.5 parts of 1,5-dihydroxy-4,8-diamino-7-p-hydroxyphenylanthraquinone and 7.5 parts of 1,5-dihydroxy-4,8-diamino-7-p-methoxyphenylanthraquinone (100% strength, moist press cake) is stirred in 10.6 parts of 2-chloro-4,6-bis-diethylamino-s-triazine are added at room temperature.

The mixture is heated slowly to 100°–105° C. under a gentle stream of nitrogen, while stirring rapidly, and is kept at this temperature until a water/o-dichlorobenzene mixture no longer passes over. Thereafter, the mixture is refluxed and stirred until all the starting material has been consumed; this takes about ¼–½ hour. It is then cooled to about 100° C., and the o-dichlorobenzene is stripped off by steam distillation, the suspension being rendered alkaline with a small amount of ammonia water. The dye is then filtered off under suction while still warm, and washed neutral with warm water. 22 parts of a dye mixture are obtained, which has a melting point of about 198° C. and differs from the starting material in that a hydrogen atom of an amino group has been replaced by a 4,6-bis-diethylamino-s-triazinyl radical. The dye gives very fast beautiful blue hues on polyester/cotton.

EXAMPLE 3

(a) Reaction of 1,5-dihydroxy-4,8-diamino-x-bromoanthraquinone with cyanuric chloride 73 parts of 1,5-dihydroxy-4,8-diamino-x-bromoanthraquinone in 400 parts of nitrobenzene are heated at about 200° C. under a gentle stream of nitrogen, while stirring, the distillate being collected in the descending condenser as long as drops of water pass over. Thereafter, the mixture is cooled to 100° C., 45 parts of cyanuric chloride are added a little at a time in the course of 20 minutes, and a gentle stream of nitrogen is again passed over the mixture, which is heated to 120° C. and stirred at this temperature until hydrogen chloride is no longer evolved; this is the case after from 3 to 4 hours. The mixture is cooled, and the product is then filtered off rapidly under suction; if the mixture has become too thick, it may be diluted with a small amount of toluene. The residue is washed with toluene until nitrobenzene can no longer be detected in the filtrate, and is then dried under reduced pressure. 84 parts of a dye intermediate of the formula:

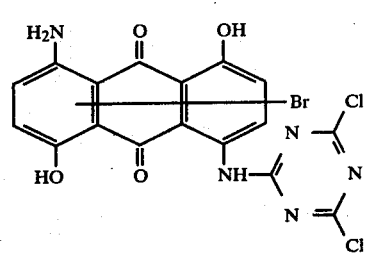

are obtained.

(b) Reaction to give the dye 20 parts of the product obtained as described in Example 3(a) are introduced into 100 parts of dimethylformamide, and the mixture is heated, at 120° C., with 21 parts of 2-ethylhexylamine until all the starting material has reacted; this takes from 3 to 4 hours. The mixture is cooled to room temperature, and the resulting solution is added dropwise to a mixture of 1,000 parts of water, 1,000 parts of ice, 120 parts of methanol and 150 parts of glacial acetic acid, while stirring vigorously. The dye is precipitated in finely divided form, and the precipitate is washed with a large amount of water and dried under reduced pressure. 25.6 parts of a dye of the formula

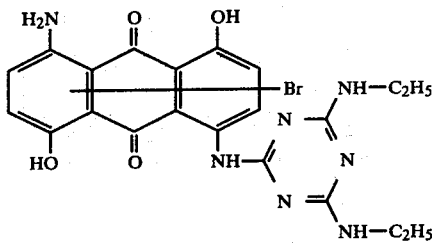

are obtained in the form of a dark blue crystalline powder having a melting point of about 180° C.

EXAMPLE 4

A mixture of 200 parts of water and 200 parts of 50% strength aqueous ethylamine is introduced into an autoclave. 20 parts of the product obtained as described in Example 3(a) are introduced, while stirring, and the mixture is stirred for 8 hours at about 100° C., in the closed autoclave. The content of the autoclave is cooled, let down, and diluted with water, the product is filtered off under suction, washed neutral with warm water and dried, and 16.6 parts of a dark blue crystalline dye of the formula are obtained. The dye has a melting point of 232° C., and dyes polyester/cotton in very fast beautiful blue hues.

EXAMPLES 5 TO 116

The following dyes of the formulae Ia, Ib and Ic are prepared by a procedure similar to that described in Examples 1, 2 or 3, and 4.

| Example | n | Hal | $R^1$ | $R^2$ | $R^3$ | $R^4$ | Hue |
|---|---|---|---|---|---|---|---|

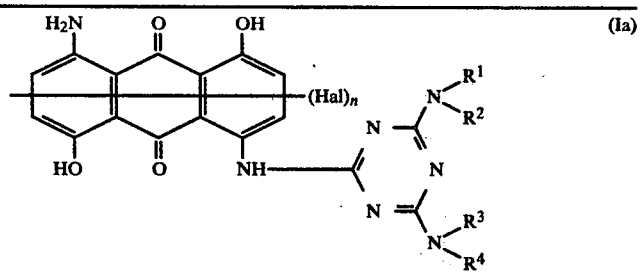
(Ia)

| Example | n | Hal | $R^1$ | $R^2$ | $R^3$ | $R^4$ | Hue |
|---|---|---|---|---|---|---|---|
| 5 | 1 | Br | $C_2H_5$ | $C_2H_5$ | $C_2H_5$ | $C_2H_5$ | blue |
| 6 | 1 | Br | $CH_3$ | $CH_3$ | $C_2H_5$ | $C_2H_5$ | blue |
| 7 | 1 | Br | H | $CH_3$ | H | $CH_3$ | blue |
| 8 | 1 | Br | H | $C_2H_5$ | H | $C_2H_5$ | blue |
| 9 | 1 | Br | H | $CH_3$ | H | $C_2H_5$ | blue |
| 10 | 1 | Br | H | $CH(CH_3)_2$ | H | $CH(CH_3)_2$ | blue |
| 11 | 1 | Br | H | $CH_2CH(CH_3)_2$ | H | $CH_2CH(CH_3)_2$ | blue |
| 12 | 1 | Br | H | $(CH_2)_2OCH_3$ | H | $(CH_2)_2OCH_3$ | blue |
| 13 | 2 | Br | $C_2H_5$ | $C_2H_5$ | $C_2H_5$ | $C_2H_5$ | blue |
| 14 | 2 | Br | $CH_3$ | $CH_3$ | $C_2H_5$ | $C_2H_5$ | blue |
| 15 | 2 | Br | H | $CH_3$ | H | $CH_3$ | blue |
| 16 | 2 | Br | H | $C_2H_5$ | H | $C_2H_5$ | blue |
| 17 | 2 | Br | H | $CH_3$ | H | $C_2H_5$ | blue |
| 18 | 2 | Br | H | $CH(CH_3)_2$ | H | $CH(CH_3)_2$ | blue |
| 19 | 2 | Br | H | $CH_2CH(CH_3)_2$ | H | $CH_2CH(CH_3)_2$ | blue |
| 20 | 2 | Br | H | $(CH_2)_2OCH_3$ | H | $(CH_2)_2OCH_3$ | blue |
| 21 | 1 | Cl | $C_2H_5$ | $C_2H_5$ | $C_2H_5$ | $C_2H_5$ | blue |
| 22 | 1 | Cl | $CH_3$ | $CH_3$ | $C_2H_5$ | $C_2H_5$ | blue |
| 23 | 1 | Cl | H | $CH_3$ | H | $CH_3$ | blue |
| 24 | 1 | Cl | H | $C_2H_5$ | H | $C_2H_5$ | blue |
| 25 | 1 | Cl | H | $CH_3$ | H | $C_2H_5$ | blue |
| 26 | 1 | Cl | H | $CH(CH_3)_2$ | H | $CH(CH_3)_2$ | blue |
| 27 | 1 | Cl | H | $CH_2CH(CH_3)_2$ | H | $CH_2CH(CH_3)_2$ | blue |
| 28 | 1 | Cl | H | $(CH_2)_2OCH_3$ | H | $(CH_2)_2OCH_3$ | blue |
| 29 | 2 | Cl | $C_2H_5$ | $C_2H_5$ | $C_2H_5$ | $C_2H_5$ | blue |
| 30 | 2 | Cl | $CH_3$ | $CH_3$ | $C_2H_5$ | $C_2H_5$ | blue |
| 31 | 2 | Cl | H | $CH_3$ | H | $CH_3$ | blue |
| 32 | 2 | Cl | H | $C_2H_5$ | H | $C_2H_5$ | blue |
| 33 | 2 | Cl | H | $CH_3$ | H | $C_2H_5$ | blue |
| 34 | 2 | Cl | H | $CH(CH_3)_2$ | H | $CH(CH_3)_2$ | blue |
| 35 | 2 | Cl | H | $CH_2CH(CH_3)_2$ | H | $CH_2CH(CH_3)_2$ | blue |
| 36 | 2 | Cl | H | $(CH_2)_2OCH_3$ | H | $(CH_2)_2OCH_3$ | blue |

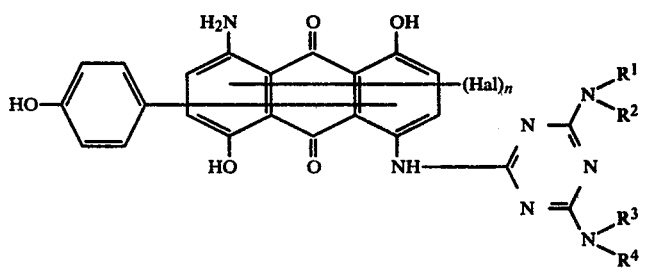
(Ib)

| Example | n | Hal | $R^1$ | $R^2$ | $R^3$ | $R^4$ | Hue |
|---|---|---|---|---|---|---|---|
| 37 | 0 | — | $C_2H_5$ | $C_2H_5$ | $C_2H_5$ | $C_2H_5$ | blue |
| 38 | 0 | — | $CH_3$ | $CH_3$ | $C_2H_5$ | $C_2H_5$ | blue |
| 39 | 0 | — | H | $CH_3$ | H | $CH_3$ | blue |
| 40 | 0 | — | H | $C_2H_5$ | H | $C_2H_5$ | blue |
| 41 | 0 | — | H | $CH_3$ | H | $C_2H_5$ | blue |
| 42 | 0 | — | H | $CH(CH_3)_2$ | H | $CH(CH_3)_2$ | blue |
| 43 | 0 | — | H | $CH_2CH(CH_3)_2$ | H | $CH_2CH(CH_3)_2$ | blue |
| 44 | 0 | — | H | $(CH_2)_2OCH_3$ | H | $(CH_2)_2OCH_3$ | blue |
| 45 | 1 | Cl | $C_2H_5$ | $C_2H_5$ | $C_2H_5$ | $C_2H_5$ | blue |
| 46 | 1 | Cl | $CH_3$ | $CH_3$ | $C_2H_5$ | $C_2H_5$ | blue |
| 47 | 1 | Cl | H | $CH_3$ | H | $CH_3$ | blue |
| 48 | 1 | Cl | H | $C_2H_5$ | H | $C_2H_5$ | blue |
| 49 | 1 | Cl | H | $CH_3$ | H | $C_2H_5$ | blue |
| 50 | 1 | Cl | H | $CH(CH_3)_2$ | H | $CH(CH_3)_2$ | blue |
| 51 | 1 | Cl | H | $CH_2CH(CH_3)_2$ | H | $CH_2CH(CH_3)_2$ | blue |
| 52 | 1 | Cl | H | $(CH_2)_2OCH_3$ | H | $(CH_2)_2OCH_3$ | blue |
| 53 | 2 | Cl | $C_2H_5$ | $C_2H_5$ | $C_2H_5$ | $C_2H_5$ | blue |
| 54 | 2 | Cl | $CH_3$ | $CH_3$ | $C_2H_5$ | $C_2H_5$ | blue |
| 55 | 2 | Cl | H | $CH_3$ | H | $CH_3$ | blue |
| 56 | 2 | Cl | H | $C_2H_5$ | H | $C_2H_5$ | blue |

-continued

| Example | n | Hal | R¹ | R² | R³ | R⁴ | Hue |
|---|---|---|---|---|---|---|---|
| 57 | 2 | Cl | H | CH₃ | H | C₂H₅ | blue |
| 58 | 2 | Cl | H | CH(CH₃)₂ | H | CH(CH₃)₂ | blue |
| 59 | 2 | Cl | H | CH₂CH(CH₃)₂ | H | CH₂CH(CH₃)₂ | blue |
| 60 | 2 | Cl | H | (CH₂)₂OCH₃ | H | (CH₂)₂OCH₃ | blue |
| 61 | 1 | Br | C₂H₅ | C₂H₅ | C₂H₅ | C₂H₅ | blue |
| 62 | 1 | Br | CH₃ | CH₃ | C₂H₅ | C₂H₅ | blue |
| 63 | 1 | Br | H | CH₃ | H | CH₃ | blue |
| 64 | 1 | Br | H | C₂H₅ | H | C₂H₅ | blue |
| 65 | 1 | Br | H | CH₃ | H | C₂H₅ | blue |
| 66 | 1 | Br | H | CH(CH₃)₂ | H | CH(CH₃)₂ | blue |
| 67 | 1 | Br | H | CH₂CH(CH₃)₂ | H | CH₂CH(CH₃)₂ | blue |
| 68 | 1 | Br | H | (CH₂)₂OCH₃ | H | (CH₂)₂OCH₃ | blue |
| 69 | 2 | Br | C₂H₅ | C₂H₅ | C₂H₅ | C₂H₅ | blue |
| 70 | 2 | Br | CH₃ | CH₃ | C₂H₅ | C₂H₅ | blue |
| 71 | 2 | Br | H | CH₃ | H | CH₃ | blue |
| 72 | 2 | Br | H | C₂H₅ | H | C₂H₅ | blue |
| 73 | 2 | Br | H | CH₃ | H | C₂H₅ | blue |
| 74 | 2 | Br | H | CH(CH₃)₂ | H | CH(CH₃)₂ | blue |
| 75 | 2 | Br | H | (CH₂CH(CH₃)₂ | H | CH₂CH(CH₃)₂ | blue |
| 76 | 2 | Br | H | (CH₂)₂OCH₃ | H | (CH₂)₂OCH₃ | blue |

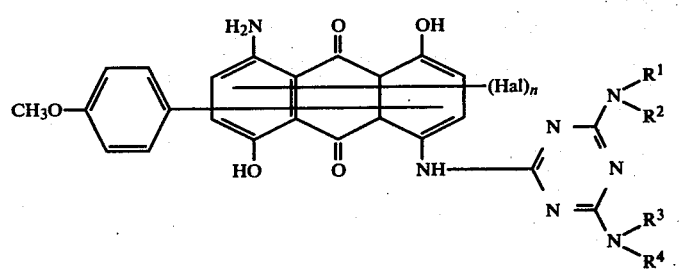

(Ic)

| | n | Hal | R¹ | R² | R³ | R⁴ | Hue |
|---|---|---|---|---|---|---|---|
| 77 | 0 | — | C₂H₅ | C₂H₅ | C₂H₅ | C₂H₅ | blue |
| 78 | 0 | — | CH₃ | CH₃ | C₂H₅ | C₂H₅ | blue |
| 79 | 0 | — | H | CH₃ | H | CH₃ | blue |
| 80 | 0 | — | H | C₂H₅ | H | C₂H₅ | blue |
| 81 | 0 | — | H | CH₃ | H | C₂H₅ | blue |
| 82 | 0 | — | H | CH(CH₃)₂ | H | CH(CH₃)₂ | blue |
| 83 | 0 | — | H | CH₂CH(CH₃)₂ | H | CH₂CH(CH₃)₂ | blue |
| 84 | 0 | — | H | (CH₂)₂OCH₃ | H | (CH₂)₂OCH₃ | blue |
| 85 | 1 | Cl | C₂H₅ | C₂H₅ | C₂H₅ | C₂H₅ | blue |
| 86 | 1 | Cl | CH₃ | CH₃ | C₂H₅ | C₂H₅ | blue |
| 87 | 1 | Cl | H | CH₃ | H | CH₃ | blue |
| 88 | 1 | Cl | H | C₂H₅ | H | C₂H₅ | blue |
| 89 | 1 | Cl | H | CH₃ | H | C₂H₅ | blue |
| 90 | 1 | Cl | H | CH(CH₃)₂ | H | CH(CH₃)₂ | blue |
| 91 | 1 | Cl | H | CH₂CH(CH₃)₂ | H | CH₂CH(CH₃)₂ | blue |
| 92 | 1 | Cl | H | (CH₂)₂OCH₃ | H | (CH₂)₂OCH₃ | blue |
| 93 | 2 | Cl | C₂H₅ | C₂H₅ | C₂H₅ | C₂H₅ | blue |
| 94 | 2 | Cl | CH₃ | CH₃ | C₂H₅ | C₂H₅ | blue |
| 95 | 2 | Cl | H | CH₃ | H | CH₃ | blue |
| 96 | 2 | Cl | H | C₂H₅ | H | C₂H₅ | blue |
| 97 | 2 | Cl | H | CH₃ | H | C₂H₅ | blue |
| 98 | 2 | Cl | H | CH(CH₃)₂ | H | CH(CH₃)₂ | blue |
| 99 | 2 | Cl | H | CH₂CH(CH₃)₂ | H | CH₂CH(CH₃)₂ | blue |
| 100 | 2 | Cl | H | (CH₂)₂OCH₃ | H | (CH₂)₂OCH₃ | blue |
| 101 | 1 | Br | C₂H₅ | C₂H₅ | C₂H₅ | C₂H₅ | blue |
| 102 | 1 | Br | CH₃ | CH₃ | C₂H₅ | C₂H₅ | blue |
| 103 | 1 | Br | H | CH₃ | H | CH₃ | blue |
| 104 | 1 | Br | H | C₂H₅ | H | C₂H₅ | blue |
| 105 | 1 | Br | H | CH₃ | H | C₂H₅ | blue |
| 106 | 1 | Br | H | CH(CH₃)₂ | H | CH(CH₃)₂ | blue |
| 107 | 1 | Br | H | CH₂CH(CH₃)₂ | H | CH₂CH(CH₃)₂ | blue |
| 108 | 1 | Br | H | (CH₂)₂OCH₃ | H | (CH₂)₂OCH₃ | blue |
| 109 | 2 | Br | C₂H₅ | C₂H₅ | C₂H₅ | C₂H₅ | blue |
| 110 | 2 | Br | CH₃ | CH₃ | C₂H₅ | C₂H₅ | blue |
| 111 | 2 | Br | H | CH₃ | H | CH₃ | blue |
| 112 | 2 | Br | H | C₂H₅ | H | C₂H₅ | blue |
| 113 | 2 | Br | H | CH₃ | H | C₂H₅ | blue |
| 114 | 2 | Br | H | CH(CH₃)₂ | H | CH(CH₃)₂ | blue |
| 115 | 2 | Br | H | CH₂CH(CH₃)₂ | H | CH₂CH(CH₃)₂ | blue |
| 116 | 2 | Br | H | (CH₂)₂OCH₃ | H | (CH₂)₂OCH₃ | blue |

We claim:
1. A dye of the formula

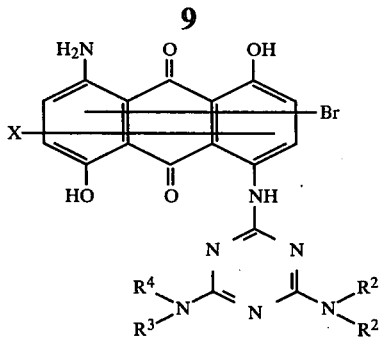
where X is hydrogen, 4-hydroxyphenyl or 4-methoxyphenyl, and
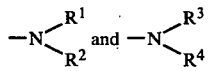
are each independently —N(CH₃)₂ or —NHCH₃.
2. The dye as claimed in claim 1, wherein X is hydrogen and
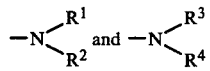
are each —N(CH₃)₂.
* * * * *